Oct. 2, 1923.
J. R. WELCH
METALLIC VEHICLE WHEEL
Filed April 23, 1921
1,469,746
2 Sheets-Sheet 1
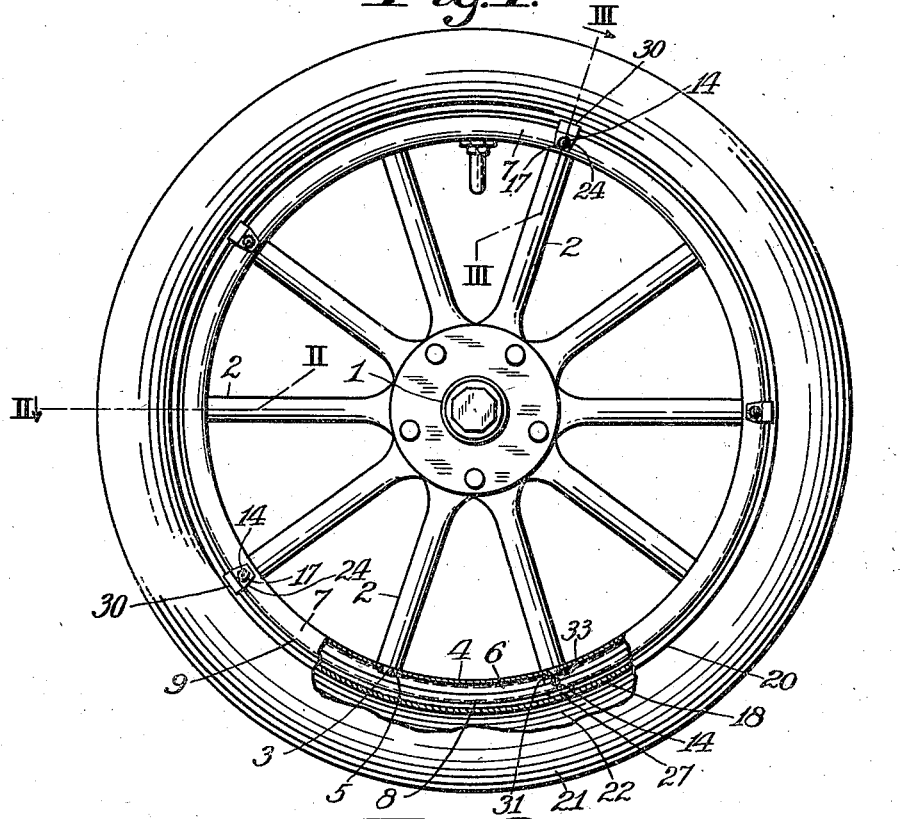
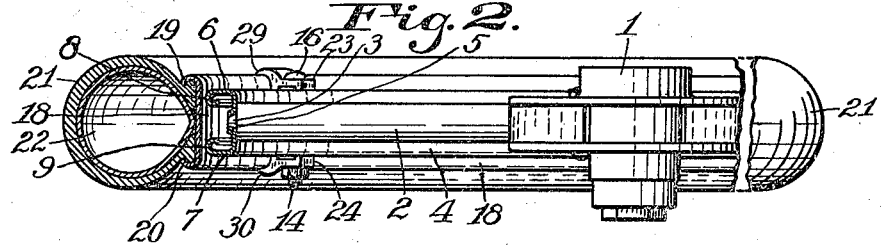
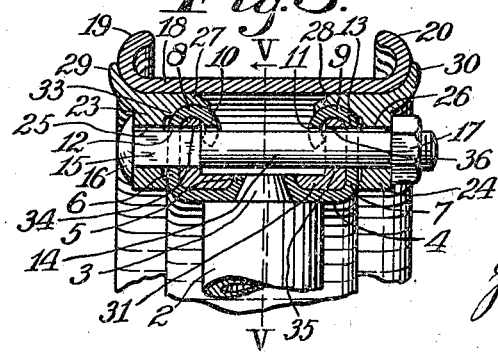
INVENTOR:
John R. Welch,
BY
E. D. Silvius,
ATTORNEY.

Oct. 2, 1923. 1,469,746
J. R. WELCH
METALLIC VEHICLE WHEEL
Filed April 23, 1921  2 Sheets-Sheet 2

INVENTOR:
John R. Welch,
BY
E. T. Silvius,
ATTORNEY.

Patented Oct. 2, 1923.

1,469,746

UNITED STATES PATENT OFFICE.

JOHN R. WELCH, OF MUNCIE, INDIANA; VIOLA M. WELCH EXECUTRIX OF SAID JOHN R. WELCH, DECEASED, ASSIGNOR TO VIOLA M. WELCH, OF MUNCIE, INDIANA.

METALLIC VEHICLE WHEEL.

Application filed April 23, 1921. Serial No. 464,002.

*To all whom it may concern:*

Be it known that I, JOHN R. WELCH, a citizen of the United States, residing at Muncie, in the county of Delaware and State of Indiana, have invented a new and useful Metallic Vehicle Wheel, of which the following is a specification, reference being had to the accompanying drawings and to the letters and figures of reference marked thereon.

This invention relates to the type of wheel that is built up of parts which may be made of sheet metal, the invention having reference more particularly to the circumferential portion of the wheel comprising a felly and a removable rim or tire so as to be adaptable to be equipped with either a pneumatic tire or a metallic or other tire.

An object of the invention is to provide a wheel having an improved felly or rim portion which shall be of light weight and not costly, but yet stiff and substantial so as to be reliable and durable.

Another object is to provide a wheel which shall be so constructed as to be enabled to securely hold a tire removably thereon and permit quick changes of tires.

A further object is to provide a wheel which may be useful on horse-drawn vehicles but which shall be especially advantageous on motor vehicles, whether pneumatic tires or solid rubber tires are desired thereon.

A still further object is to provide a metallic wheel which shall be of such design as to permit of its being constructed of thin sheet metal of such form as to be stiff and not be liable to become fractured or bent in use.

With the above-mentioned and other objects in view, the invention consists in a metallic wheel having a novel felly and provided with improved devices for securing a rim or tire on the felly; and, the invention consists also further in the parts and combinations and arrangements of parts as hereinafter particularly described and further defined in the appended claims.

Figure 4:
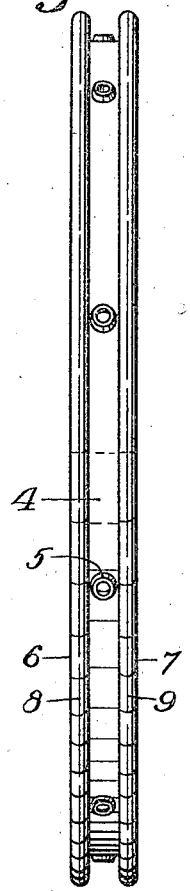
Figure 5:
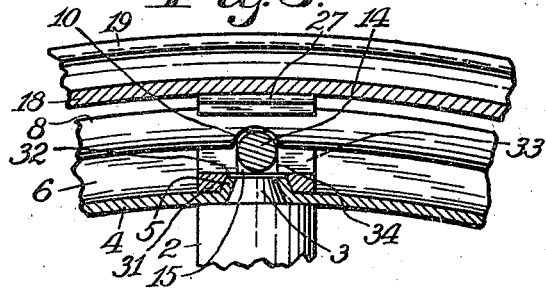
Figure 6:
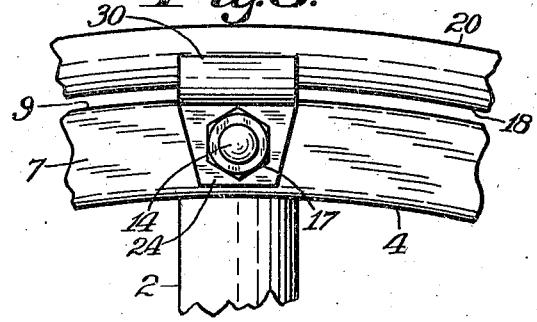
Figure 7:
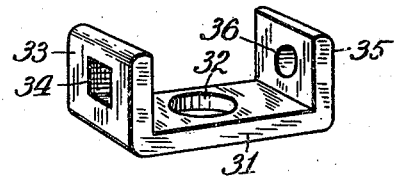
Figure 8:
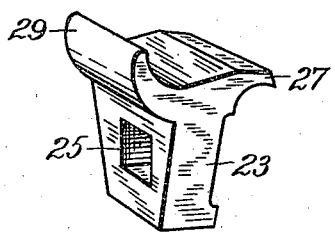
Figure 9:
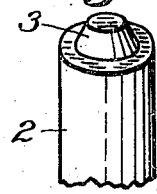

Referring to the drawings,—Figure 1 is a front or outer side view of a vehicle wheel constructed substantially in accordance with the invention, portions being broken away to disclose structure in section; Fig. 2 is a fragmentary section approximately on the line II—II in Fig. 1 on an enlarged scale; Fig. 3 is a fragmentary section on a further enlarged scale approximately on the line III—III in Fig. 1; Fig. 4 is a peripheral view of the improved wheel felly; Fig. 5 is a fragmentary section approximately on the line V—V in Fig. 3; Fig. 6 is a fragmentary front face view of the wheel; Fig. 7 is a perspective view of one of the parts with which the improved felly preferably is provided; Fig. 8 is a perspective view of one of the lugs comprised in the invention; and, Fig. 9 is a fragmentary perspective view showing a spoke adapted to be used in connection with the improved felly.

Similar reference characters in the different figures of the drawings indicate corresponding elements or features of construction herein referred to in detail.

In the construction of the wheel a suitable hub 1 is provided to which a suitable number of spokes 2 are connected, the spokes preferably being metallic and hollow, but may in some cases be wooden, and the end of each spoke has a tapered tenon 3 thereon.

The improved felly comprises a circular body or band portion 4 having a suitable number of annular conical frustums 5 pressed on the outer portion thereof to constitute sockets and dowels combined which receive the spoke tenons. The felly has outwardly-extending flanges on opposite edge portions thereof which constitute side members 6 and 7 which are turned over each towards the other to constitute stiff bearing or tread ribs 8 and 9. In some cases the rib portions are turned over and inward towards the body portion 4 more or less, and in some cases the terminal or edge portions thereof have notches 10 and 11 therein respectively to receive portions of securing bolts. The side members of the felly are provided with suitable bolt holes, preferably arranged in proximity to the spoke sockets, the side member 6 having preferably a squared hole 12 and the member 7 having a circular hole 13. A suitable number of bolts 14 are provided which are mainly cylindrical as usual but have each a squared portion 15 extending into the squared hole 12 and having a head 16 thereon, the cylindrical portion of the bolt extending through the hole 13 and being provided with a nut 17.

Various patterns of demountable rims or metallic tires may be mounted on the felly, a simple form of demountable rim being illustrated which comprises an annular body portion 18 having clincher flanges 19 and 20 thereon, the body portion being greater in diameter than the tread ribs 8 and 9 of the felly. The rim is designed to be equipped with a tire casing 21 having an air tube 22 therein.

A suitable number of novel lugs are provided which comprise body portions 23 and 24 respectively adapted to seat against the faces of the sides 6 and 7 respectively, one body portion having a squared hole 25 therein receiving the squared portion 15 of a securing bolt, the body portion of the companion lug having a similar hole 26 therein to receive the bolt. The two lugs of each pair have seat members 27 and 28 thereon that are approximately wedge shaped and forced between the main part 18 of the rim and the respective bearing ribs of the felly, and the body portions of the lugs have also curved lips 29 and 30 thereon to engage the edge portions of the rim.

Preferably the felly is provided with a suitable number of core blocks which comprise each a base plate 31 that is seated on and reinforces the main portion 4 of the felly opposite to the spoke and having an aperture 32 receiving one of the socket walls or dowel projections 5, to key the block in place, one portion of the plate 31 having a side member 32 which is arranged under the rib 8 and against the side member 6, reinforcing the rib and the side member, and being provided with a squared hole 34 that receives the squared portion of the bolt, the head of the bolt having contact with the outer side of the main portion of the adjacent lug; and the opposite portion of the plate 31 has a side member 35 thereon that is arranged under the rib member 9 and against the side member 7 of the felly to reinforce them, and it has a bolt hole 36 therein through which the securing bolt extends, and all the parts being assembled, the nut 17 is forced against the opposite or outer side of the body portion of the adjacent lug.

It should be understood that in some cases the inner lugs may be electrically welded to the felly, and might be welded also to the securing bolts.

In practical use, the several parts of the wheel being assembled and secured together as explained, the wheel reliably operates and carries the load which may be placed on it, the rim or tire being securely retained in place by the secured lugs and bolts. When it is desired to change tires, the nuts may be readily removed from the securing bolts after which the lugs may be loosened and the outer lugs removed or partially turned on the bolts, permitting the rim to be readily taken away and replaced by another or be again applied to the wheel as before.

Having thus described the invention, what is claimed as new is—

1. A vehicle wheel including a metallic wheel felly comprising a circular body and two opposite outwardly-extending flanges thereon, each flange having a turned-over bearing rib extending continuously about the body and also inwardly appreciably towards the body at a distance from the main portion of the flange, each flange having holes therein to receive lug-bolts.

2. A vehicle wheel including a metallic wheel felly having a circular main portion and a plurality of blocks spaced apart on the outer side of the main portion, the main portion having opposite side flanges embracing opposite portions respectively of the blocks and having also outward-extending integral portions engaging the blocks, each flange having bolt holes adjacent to the blocks and lugs arranged at the outer side of the flanges, each two lugs being adjacent to opposite portions respectively of a block and provided with a securing bolt.

3. A vehicle wheel including a metallic wheel felly comprising a circular body and two opposite outwardly-extending flanges thereon, each of the flanges having a bearing rib thereon turned over and extending continuously about the body and also inwardly appreciably towards the body at a distance from the main portion of the flange, the flanges having oppositely-arranged holes therein, and lug-bolts arranged in the holes of the flanges and extending across the inner terminal edges of the bearing ribs and assisting in supporting the ribs.

4. In a vehicle wheel, the combination with a felly comprising a circular body and two opposite flanges thereon, and a rim extending about the flanges at a distance therefrom, of a plurality of core blocks spaced apart on the felly body between the flanges, a plurality of pairs of lugs having each a main portion and a bearing projection and also a lip engaging the rim, the bearing portion of one of each pair of lugs engaging one of said flanges opposite to one end of a core block, the bearing portion of the other of each pair engaging the opposite one of said flanges opposite to the opposite end of the core block, and means securing the two of each pair of lugs to said flanges respectively.

5. In a vehicle wheel, the combination of a metallic wheel felly comprising a circular body and a plurality of core blocks spaced apart on the outer side of the body, each core block having an aperture therein and said body having a plurality of hollow dowels integral therewith and extending into the apertures in the core blocks respectively, said body having opposite side flanges provided with continuous bearing ribs respectively that are turned over to the core blocks and retain them on said body, each of said flanges having bolt-holes therein alining with the bolt-holes in the opposite flange and arranged adjacent to the core blocks.

6. In a vehicle wheel, a felly comprising a circular body having a plurality of openings spaced apart therein, two opposite side flanges on the body and extending outwardly and provided each with a turned-over bearing rib that extends continuously about said body at a distance from the flange, each of the flanges having bolt-holes therein adjacent to said openings, and a plurality of core blocks spaced apart on said body and having each an aperture therein, said apertures alining with said openings respectively, each core block having two side members extending against said flanges and the backs of said ribs respectively, said side members being provided with openings respectively to receive securing bolts to be inserted in said bolt-holes.

7. In a vehicle wheel, the combination of a metallic felly comprising a circular body and two opposite outwardly-extending flanges thereon, the flanges having turned-over continuous bearing ribs thereon respectively that extend about the circular body and inward appreciably towards the body, the terminal edge of the ribs having a plurality of notches therein opposite to the circular body, each of the flanges having bolt-holes therein arranged in correspondence with the notches respectively, and a plurality of blocks spaced apart on said body and comprising each a body plate seated on said body and two side members bearing against said flanges respectively and extending under the bearing ribs thereon, said side members having openings therein alining with said bolt-holes respectively.

8. In a vehicle wheel, the combination with a felly comprising a circular body portion and two opposite side flanges thereon, and a rim extending about the flanges at a distance therefrom, of a plurality of core blocks on said body portion and against said flanges, a plurality of bolts extending through the side flanges and also through the core blocks respectively, a plurality of lugs connected to the bolts respectively at the outer side of one of the flanges and opposite to the core blocks respectively and having each a bearing portion engaging the rim and the outer portion of the flange, and a plurality of lugs connected to the bolts respectively at the outer side of the opposite one of the flanges and opposite to the core blocks respectively and having each a bearing portion engaging the rim and the outer portion of the flange.

9. In a vehicle wheel, the combination of a felly comprising a circular main portion and two side flanges on the main portion with bolt holes therein, the flanges having tread members extending over each towards the other and inward towards said main portion, the extremity of each tread member having recesses therein, a plurality of blocks comprising each a body portion seated on the main portion of said felly and also two side members bearing against said flanges respectively and extending under the tread members thereon, said side members having each an opening therein, bolts arranged each in a bolt hole in each of said flanges and in a recess in each of said tread members and also in the opening in each of said side members, and lugs on said bolts at the outer side of each of said flanges.

10. In a vehicle wheel, the combination with a circular felly body having two opposite side flanges thereon and spoke holes spaced apart in the felly body, of a plurality of core blocks spaced apart on said body and having each an aperture therein and having also two side members bearing against the inner sides of said flanges respectively, the blocks being positioned to locate the apertures therein in alinement with the spoke-holes respectively, securing bolts extending through said flanges and the adjacent side members of said blocks, and lugs on the bolts at the outer sides of said flanges.

In testimony whereof, I affix my signature in presence of two witnesses.

JOHN R. WELCH.

Witnesses:
E. T. SILVIUS,
M. D. STEELE.